T. M. WILLIAMS.
DRAG HANDLE FOR FISHING REELS.
APPLICATION FILED OCT. 22, 1908.
940,415. Patented Nov. 16, 1909.
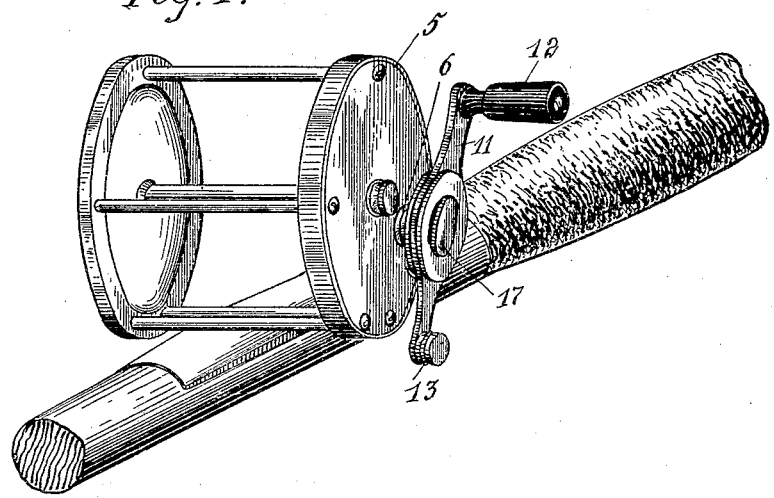
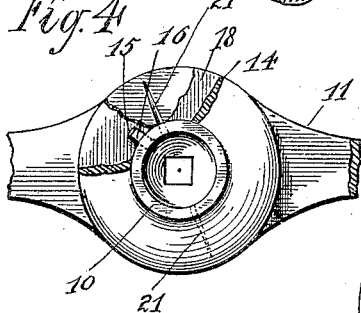
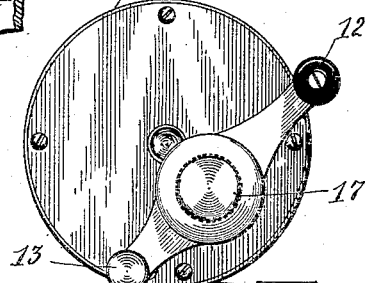
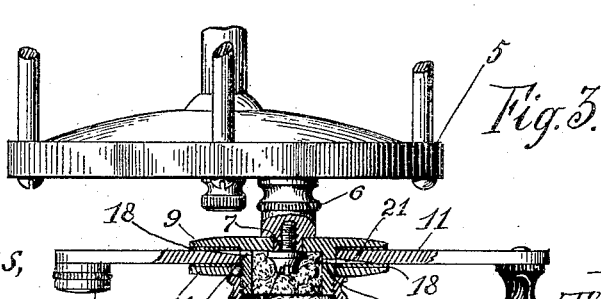
Witnesses,
F. E. Monteverde
Ollie Palmer.
Inventor,
Thomas M. Williams,
by Howard & Howe,
Attorneys.

UNITED STATES PATENT OFFICE.

THOMAS M. WILLIAMS, OF LOS ANGELES, CALIFORNIA.

DRAG-HANDLE FOR FISHING-REELS.

940,415.  Specification of Letters Patent.  Patented Nov. 16, 1909.

Application filed October 22, 1908. Serial No. 459,034.

*To all whom it may concern:*

Be it known that I, THOMAS M. WILLIAMS, a citizen of the United States, residing at Los Angeles, in the county of Los Angeles and State of California, have invented new and useful Improvements in Drag-Handles for Fishing-Reels, of which the following is a specification.

My invention relates to a friction device designed to be attached to fishing reels in lieu of the usual handles ordinarily employed, and an important object thereof is to provide a device by means of which the tension on the fishing line when in use may be increased or diminished.

Another object is to provide a device in which the frictional parts are automatically lubricated, thus insuring at all times a cool handle and eliminating all excessive wear on the operative parts of the mechanism.

A further object is to provide a simple and efficient mechanism of few parts that may be manufactured cheaply and that will fulfil the exacting conditions usually imposed upon a device of this character in a satisfactory manner.

I accomplish the above by means of the device described herein and illustrated in the accompanying drawings, in which:—

Figure 1,— is a perspective view of my improved handle applied to a fishing reel of the usual type. Fig. 2,— is a side elevation of the handle in place on a reel mounted on a rod. Fig. 3,— is a longitudinal section of the handle in place on a reel. Fig. 4,— is a detail plan view of a portion of the handle.

Heretofore drag handles have been employed on fishing reels in order to maintain a taut line and also to prevent breakage of pole and line when a large fish is hooked, any slack in the line (which is usually caused by the movements of the fish attached thereto) occasions a loss, as the fish is enabled thereby to detach itself from the hook.

I am aware that numerous handles of the above described type have been designed, but as no provision was made for lubrication, the operative parts would soon become so highly heated from friction during the operation of the reel as to cause the metal to expand, thereby subjecting the line to constant breakage. Another objection to these constructions is that in most of them the tension device was not automatically adjustable, some of the devices requiring tools for adjustment which was exceedingly inconvenient.

By the novel arrangement of the oiling and tension devices I am enabled to thoroughly lubricate the frictional members of the handle and adjust the tension without the use of tools in a simple and efficient manner.

Referring more particularly to the drawings, 5 designates a fishing reel of the usual form provided with a reel actuating mechanism (not shown) and an axle stud 6. Stud 6 is provided with a reduced square end 7 on which is rigidly mounted by means of a screw 8 an inner circular friction plate 9. Plate 9 is provided on its outer face and at right angles thereto with a circular lubricating cup 10. Loosely mounted on lubricating cup 10 is a friction member 11, which is provided on the ends thereof with an operating handle 12 and a balance weight 13. Also loosely mounted on lubricating cup 10 is an outer friction member or washer 14, which is provided with a slot 15 adapted to be engaged by a pin 16 rigidly secured to lubricating cup 10 and lock member 14 in rigid relation to friction plate 9.

In screw threaded relation with lubricating cup 10 is a tension cap 17 by means of which the frictional tension on member 11 is increased or diminished as the circumstances of the case demand, thus if the fish which has been hooked is an unusually large and strong one the tension may be instantly increased by a few turns of cap 17, while if the fish is only of ordinary size and strength it may be diminished.

To prevent any excessive wear on the operative parts of the device, I have interposed between the inner faces of members 9 and 14 and member 11 fiber washers 18, which when worn may be replaced.

Lubricating cup 10 is preferably supplied with an absorbent packing 19 which will distribute the lubricant to the operating parts in an even and economical manner, through the medium of ports 20 and grooves 21 formed in member 11.

It will be observed from the foregoing description that I have provided a simple and efficient device in which all danger of overheating of the operative parts when the handle is in use is eliminated.

It will be further observed that by means of the novel arrangement of the tension device I am enabled at all times to increase or diminish the tension on the line when a fish is hooked, thereby eliminating all danger of breaking the line.

Having described my invention, what I claim as new and desire to secure by Letters Patent is:—

1. A crank handle, comprising a rigid friction member having a lubricating device formed integrally therewith, a handle member in movable engagement therewith, a second friction member in locked engagement to said first friction member, and a tension means secured to said first named member.

2. A crank handle, comprising a plurality of friction disks, one of said disks being provided with rotating means, a lubricating device formed integrally with one of said friction disks, and a tension mechanism secured to said disks, whereby the tension on the disks may be increased or diminished.

3. A crank handle, comprising a handle and a friction device therefor, a lubricating device rigidly secured to said friction means, and means to vary the tension in said friction means.

4. A crank handle, comprising a handle and a tension mechanism therefor, means to automatically lubricate said tension mechanism, and a tension varying means secured to said mechanism.

5. A crank handle, comprising a rigid friction member having a lubricating device formed integrally therewith, a handle member in movable engagement with said member, a second friction member secured in locked engagement with said first named member, and means to vary the tension on said friction members.

6. A crank handle, comprising a revoluble handle and a friction mechanism therefor, a lubricating means secured to said friction mechanism, and means to vary the tension in the friction mechanism.

7. A crank handle mechanism, comprising a pair of friction disks, a crank handle interposed therebetween, a lubricating means for said disks and handle, and means to increase or diminish the tension of the disks against the handle.

In witness that I claim the foregoing I have hereunto subscribed my name this 14th day of October, 1908.

THOMAS M. WILLIAMS.

Witnesses:
EDMUND A. STRAUSE,
OLLIE PALMER.